No. 680,800. Patented Aug. 20, 1901.
W. H. MÜNCHMEYER.
SNAP HOOK.
(Application filed Mar. 27, 1901.)
(No Model.)
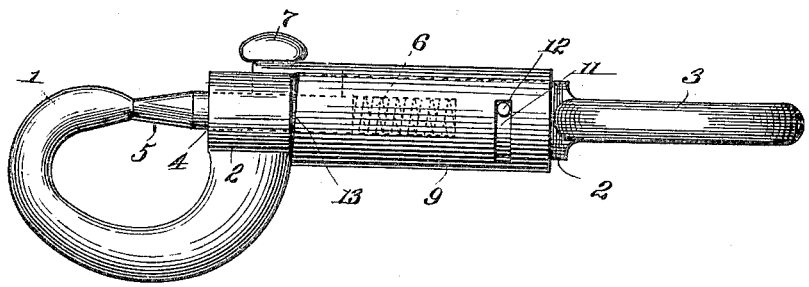
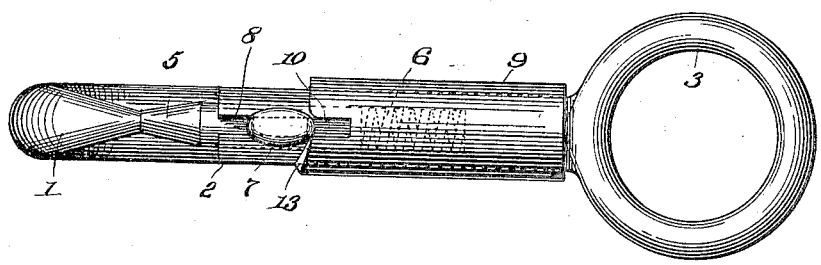
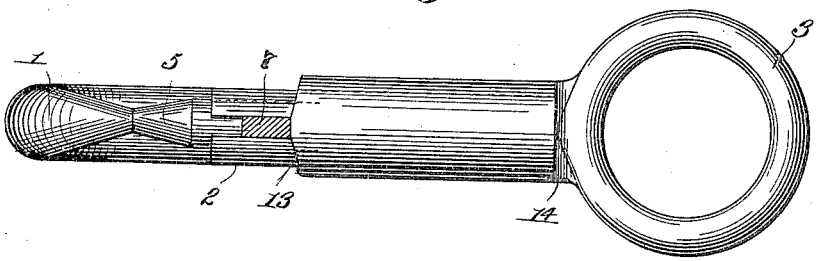
Witnesses:
S. E. McDougle.
Don C. Casto.
Inventor:
William H. Münchmeyer

UNITED STATES PATENT OFFICE.

WILLIAM H. MÜNCHMEYER, OF SCOTT, WEST VIRGINIA.

SNAP-HOOK.

SPECIFICATION forming part of Letters Patent No. 680,800, dated August 20, 1901.

Application filed March 27, 1901. Serial No. 53,089. (No model.)

*To all whom it may concern:*

Be it known that I, WILLIAM H. MÜNCHMEYER, a citizen of the United States, residing at Scott, in the county of Wood, State of West Virginia, have invented certain new and useful Improvements in Snap-Hooks; and I do hereby declare the following to be a full, clear, and exact description of the invention, such as will enable others skilled in the art to which it appertains to make and use the same.

My invention relates to snap-hooks, and has for its object to produce a hook of such character that it may be readily opened, snapped shut, and then locked securely, so that it may not be unsnapped accidentally while in use.

The invention is illustrated in the accompanying drawings, in which like notations refer to like parts in the several views.

Figure 1 is a front elevation. Fig. 2 is a side elevation; and Fig. 3 is a side elevation showing a modification, partly in section.

1 is a hook made in one piece with the shank 2, which is provided with the usual eye 3. The shank is provided with a hollow bore 4, preferably cylindrical in cross-section, in which fits the bolt 5. Behind the bolt is a spiral spring 6, which presses the bolt forward to close the hook automatically. The bolt 5 is provided with the hand-button 7, which moves in a slot 8 in the shank 2 to unsnap the bolt.

Thus far the snap-hook does not differ from those in common use.

To lock the bolt in closed position, I surround the shank 2 with a sleeve 9, which turns easily on the shank. This sleeve is provided with a slot 10, into which the push-button 7 may move on unsnapping the bolt. The sleeve 9 is also provided with a transverse slot 11, which on turning the sleeve guides the same along a pin 12, fixed in the shank. The left-hand end of the sleeve instead of being squared off, as is the right-hand end, is cut off obliquely, as shown at 13, so as to form a rotary wedge.

The operation of the device is as follows: The bolt having snapped shut against the hook, as shown in the drawings, is locked securely in place by turning the sleeve 9, when the wedge-like end 13 of the sleeve will tightly force itself against the push-button 7 and prevent the bolt from being unsnapped. I purposely avoid using a turning handle or button on the sleeve 9, as these would assist the sleeve in being turned accidentally.

As shown in the modification, Fig. 3, the shank 2 is provided with a shoulder 14, against which the sleeve 9 abuts. In case the slot 11 and the pin 12 are not required the sleeve may be turned in either direction to lock the bolt.

Having fully described my invention, what I claim as new, and desire to secure by Letters Patent, is—

1. In a snap-hook, the combination of the hook having a hollow shank, a sliding bolt therein, a projecting button on said bolt, a slot in said shank in which the button may slide, a rotatable sleeve surrounding said shank and provided with a slot for the passage of the bolt-button, the end of said sleeve being cut off obliquely to act as a wedge against said button on rotating said sleeve, substantially as described.

2. In a snap-hook, the combination of the hook having a hollow shank, a snap-bolt in the hollow of said shank, a spring in said hollow behind the bolt, a slot in said shank, a push-button attached to said bolt and movable in said slot, a rotatable sleeve surrounding the shank and provided with a slot for the passage of the push-button, said sleeve having an oblique end which wedges against the push-button to lock the bolt on turning said sleeve, substantially as described.

3. In a snap-hook, the combination of the hook provided with a hollow shank, a spring-pressed snap-bolt in the hollow of said shank, provided with a push-button capable of sliding in a slot in said shank, a rotatable sleeve upon said shank provided with a slot to accommodate said push-button, the end of said sleeve being oblique to act as a wedge against the push-button on turning said sleeve; a transverse slot in said sleeve and a pin in said slot secured to the shank, whereby the sleeve may be guided on being turned, substantially as described.

4. The combination of a hollow shank having a hook at one end and an eye at the other, a bolt capable of sliding in said hollow shank and press against the end of the hook, a push-button on said bolt, a slot in said shank to accommodate the button, with a sleeve capable of rotation, mounted on said shank, and having a slot to accommodate the push-button, the end of said sleeve being made oblique to act as a wedge against the push-button on being turned to lock the bolt into closed position, substantially as described.

In testimony whereof I have signed my name to this specification in the presence of two subscribing witnesses.

WILLIAM H. MÜNCHMEYER.

Witnesses:
W. E. McDOUGLE,
JAS. S. JOHNSON.